(12) United States Patent
Naito et al.

(10) Patent No.: US 11,827,206 B2
(45) Date of Patent: Nov. 28, 2023

(54) VEHICLE CONTROL DEVICE

(71) Applicant: HONDA MOTOR CO., LTD., Tokyo (JP)

(72) Inventors: Yosuke Naito, Tokyo (JP); Masatoshi Saito, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/668,026

(22) Filed: Feb. 9, 2022

(65) Prior Publication Data

US 2022/0258717 A1 Aug. 18, 2022

(30) Foreign Application Priority Data

Feb. 16, 2021 (JP) ................................. 2021-022921

(51) Int. Cl.
*B60W 20/00* (2016.01)
*B60K 6/46* (2007.10)
*F02D 41/12* (2006.01)

(52) U.S. Cl.
CPC .............. *B60W 20/00* (2013.01); *B60K 6/46* (2013.01); *F02D 41/123* (2013.01); *B60W 2510/0638* (2013.01); *B60W 2520/105* (2013.01); *B60W 2710/0616* (2013.01); *B60W 2710/0644* (2013.01); *B60Y 2200/92* (2013.01); *F02D 2200/101* (2013.01)

(58) Field of Classification Search
CPC ......... B60W 20/00; B60W 2510/0638; B60W 2510/105; B60W 2710/0616; B60W 2710/0644; B60W 2540/10; B60K 6/46; B60K 6/442; F02D 41/123; F02D 2200/10; B60Y 2200/92
See application file for complete search history.

(56) References Cited

U.S. PATENT DOCUMENTS 6,018,694 A * 1/2000 Egami .................. B60W 10/26
   903/952
8,831,842 B2 * 9/2014 Dufford ............. B60W 10/105
   477/29

(Continued)

FOREIGN PATENT DOCUMENTS

JP    2006112384 A *  4/2006
JP    2010-173389 A    8/2010

(Continued)

OTHER PUBLICATIONS

Oct. 11, 2022, Japanese Office Action issued for related JP Application No. 2021-022921.

*Primary Examiner* — John M Zaleskas
*Assistant Examiner* — Joshua Campbell
(74) *Attorney, Agent, or Firm* — Paratus Law Group, PLLC (57) ABSTRACT

A vehicle control device is configured to: execute fuel cut control for stopping fuel supply to an internal combustion engine; when a vehicle is in series traveling, perform control based on a traveling state of the vehicle such that a rotation speed of the internal combustion engine is a predetermined target rotation speed; and when the vehicle is in the series traveling and there is a deceleration request, execute the fuel cut control in accordance with a rotation speed difference between a rotation speed of the internal combustion engine and the target rotation speed.

1 Claim, 5 Drawing Sheets

(56) References Cited

U.S. PATENT DOCUMENTS

2003/0217880 A1*  11/2003  Isogai .................. B60W 30/16
                                                      180/170
2016/0068161 A1*  3/2016   Iketomi ................ B60W 20/00
                                                      180/65.265
2020/0122712 A1   4/2020   Miki et al.

FOREIGN PATENT DOCUMENTS

| JP | 2017-013752 A | | 1/2017 | |
| JP | 2017013752 A | * | 1/2017 | |
| WO | WO 2019/003443 A1 | | 1/2019 | |
| WO | WO-2019003443 A1 | * | 1/2019 | ............. B60K 6/442 |

* cited by examiner

| TRAVELING MODE | FIRST CLUTCH | SECOND CLUTCH | ENGINE | MOTOR | GENERATOR |
|---|---|---|---|---|---|
| EV TRAVELING MODE | DISENGAGE | DISENGAGE | STOP POWER OUTPUT | HYBRID DRIVE | STOP POWER GENERATION |
| HYBRID TRAVELING MODE | DISENGAGE | DISENGAGE | OUTPUT POWER | GENERATOR DRIVE | GENERATE POWER |
| LOW-SPEED SIDE ENGINE TRAVELING MODE | ENGAGE | DISENGAGE | OUTPUT POWER | OUTPUT POWER AS NECESSARY | STOP POWER GENERATION |
| HIGH-SPEED SIDE ENGINE TRAVELING MODE | DISENGAGE | ENGAGE | OUTPUT POWER | OUTPUT POWER AS NECESSARY | STOP POWER GENERATION |

| VEHICLE TRAVELING STATE IN HYBRID TRAVELING MODE | ROTATION SPEED DIFFERENCE BETWEEN ENGINE ROTATION SPEED AND TARGET ROTATION SPEED | |
| --- | --- | --- |
| | LARGE (EQUAL TO OR GREATER THAN THRESHOLD) | SMALL (LESS THAN THRESHOLD) |
| AT TIME OF ACCELERATION | NOT EXECUTE FUEL CUT CONTROL | NOT EXECUTE FUEL CUT CONTROL |
| AT TIME OF DECELERATION | EXECUTE FUEL CUT CONTROL | NOT EXECUTE FUEL CUT CONTROL |

FIG. 5

VEHICLE CONTROL DEVICE

CROSS-REFERENCE TO RELATED APPLICATIONS

This application is based on and claims priority under 35 USC 119 from Japanese Patent Application No. 2021-022921 filed on Feb. 16, 2021, the contents of which are incorporated herein by reference.

TECHNICAL FIELD

The present disclosure relates to a vehicle control device.

BACKGROUND

In a series type hybrid electric vehicle, a generator is driven by an internal combustion engine and an electric motor is driven by the generated electric power, thereby causing the vehicle to travel. For this reason, when power generation is required, if the internal combustion engine is operated steadily at an operating point at which the efficiency is highest, the fuel efficiency is improved. However, an operation sound of the internal combustion engine that is steadily operated does not change even if an operation of a driver on an accelerator pedal or a speed of the vehicle (that is, a vehicle speed) changes. In this regard, a driver who gets used to a vehicle including an internal combustion engine and a transmission has a feeling of strangeness, and high marketability of the vehicle cannot be expected. For this reason, even for a series type hybrid electric vehicle, high marketability and a natural feeling for a driver are desired.

International Publication No. WO2019/003443 (hereinafter, referred to as Patent Literature 1) discloses a technique in which, in a vehicle capable of series traveling, a rotation speed of an internal combustion engine (engine) is increased or decreased between a lower-limit rotation speed and an upper-limit rotation speed accompanying an increase in a rotation speed of a drive wheel (that is, a vehicle speed).

According to Patent Literature 1, it is possible to provide a natural feeling that a vehicle speed and an operation sound of the internal combustion engine are linked with each other to the driver at the time of acceleration in series traveling as if the vehicle were a vehicle including an internal combustion engine and a transmission.

However, in the related art, a rotation speed of an internal combustion engine at the time of deceleration during series traveling has not been sufficiently studied, and there is room for improvement in this respect. For example, when the rotation speed of the internal combustion engine is kept high without decrease even though the vehicle is decelerating, a driver may have a feeling of strangeness, which may lead to a decrease in the marketability of the vehicle.

The present disclosure provides a vehicle control device capable of appropriately suppressing a rotation speed of an internal combustion engine from being kept high at the time of deceleration during series traveling in a vehicle capable of series traveling in which electric power generated by a generator is supplied to an electric motor and the electric motor drives drive wheels to cause the vehicle to travel.

SUMMARY

The present disclosure provides a vehicle control device that controls a vehicle, the vehicle including an internal combustion engine, a generator driven by the internal combustion engine, and an electric motor coupled to a drive wheel and capable of driving the drive wheel by being supplied with electric power from the generator, and the vehicle being capable of series traveling in which electric power generated by the generator is supplied to the electric motor and the electric motor drives the drive wheel to cause the vehicle to travel, in which the vehicle control device is configured to:
execute fuel cut control for stopping fuel supply to the internal combustion engine,
when the vehicle is in the series traveling, perform control based on a traveling state of the vehicle such that a rotation speed of the internal combustion engine is a predetermined target rotation speed, and
when the vehicle is in the series traveling and there is a deceleration request, execute the fuel cut control in accordance with a rotation speed difference between the rotation speed of the internal combustion engine and the target rotation speed.

According to the present disclosure, a vehicle control device can be provided that is capable of appropriately suppressing a rotation speed of an internal combustion engine from being kept high at the time of deceleration during series traveling in a vehicle capable of series traveling in which electric power generated by a generator is supplied to an electric motor and the electric motor drives drive wheels to cause the vehicle to travel.

BRIEF DESCRIPTION OF DRAWINGS

Exemplary embodiments of the present invention will be described in detail based on the following figures, wherein.

DESCRIPTION OF EMBODIMENTS

Hereinafter, an embodiment of a vehicle control device according to the present disclosure will be described in detail with reference to the drawings.

Figure 1:
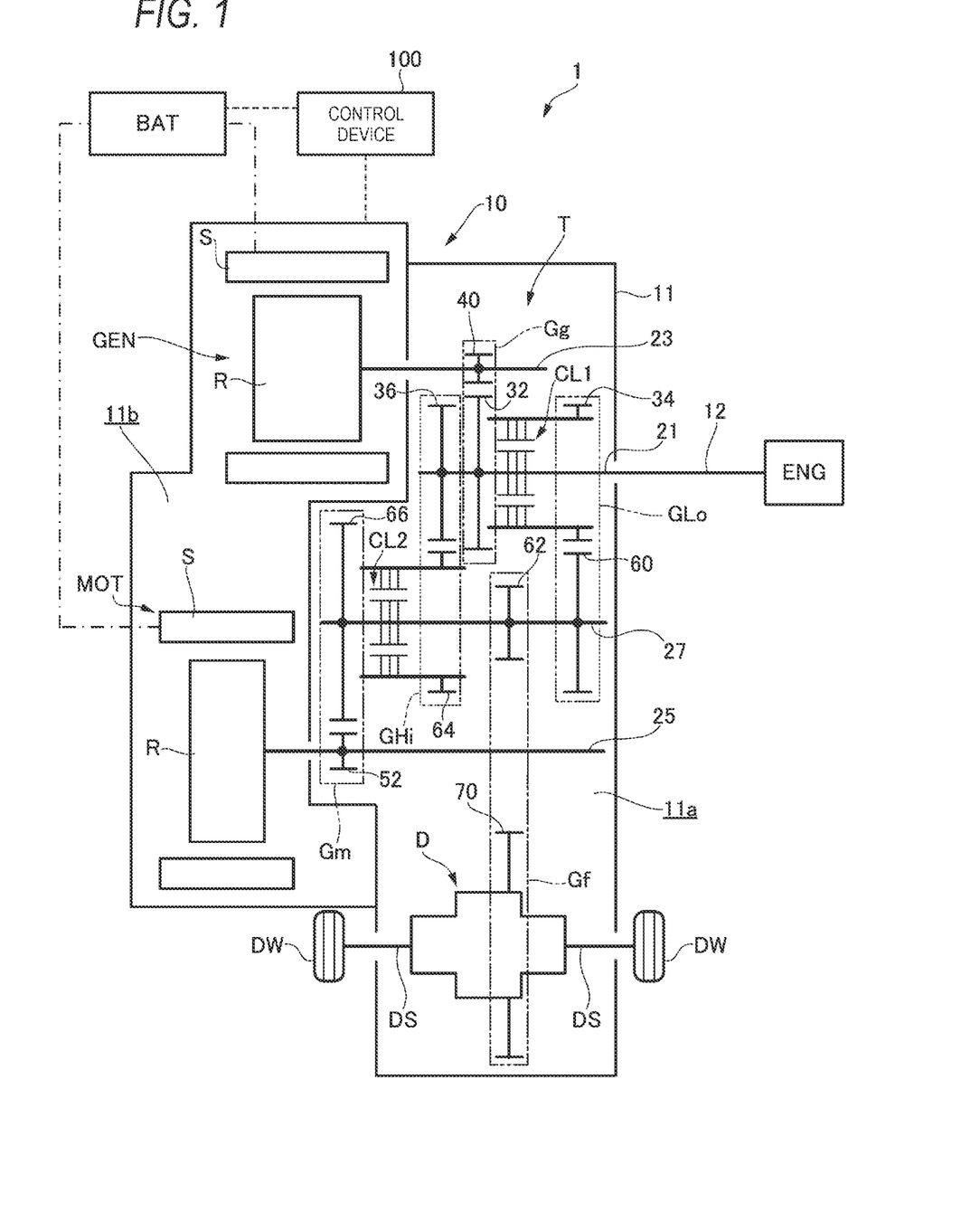
FIG. 1 is a diagram illustrating a schematic configuration of a vehicle including a control device according to an embodiment of the present disclosure.

First, a vehicle 1 including a control device 100 according to an embodiment of a vehicle control device of the present disclosure will be described with reference to FIG. 1. As illustrated in FIG. 1, the vehicle 1 of the present embodiment includes a drive device 10 that outputs a driving force of the vehicle 1, and the control device 100 that performs control of the entire vehicle 1 including the drive device 10.

[Drive Device]

As illustrated in FIG. 1, the drive device 10 includes an engine ENG that is an example of an internal combustion engine according to the present disclosure, a generator GEN that is an example of a generator according to the present disclosure, a motor MOT that is an example of an electric motor according to the present disclosure, a transmission T, and a case 11 that accommodates the generator GEN, the motor MOT, and the transmission T. The motor MOT and the generator GEN are connected to a battery BAT provided in the vehicle 1, and supply of electric power from the battery BAT and energy regeneration to the battery BAT are possible.

[Transmission]

The case 11 is provided with, from an engine ENG side along an axial direction, a transmission accommodation chamber 11a that accommodates the transmission T and a motor accommodation chamber 11b that accommodates the motor MOT and the generator GEN.

The transmission accommodation chamber 11a accommodates an input shaft 21, a generator shaft 23, a motor shaft 25, and a counter shaft 27, which are disposed parallel to one another, and a differential mechanism D.

The input shaft 21 is disposed side by side and coaxially with a crankshaft 12 of the engine ENG. A driving force of the crankshaft 12 is transmitted to the input shaft 21 via a damper (not shown). On the input shaft 21, a generator drive gear 32 constituting a generator gear train Gg is provided.

On the input shaft 21, a low-speed side drive gear 34 constituting a low-speed side engine gear train GLo is provided via a first clutch CL1 on an engine side with respect to the generator drive gear 32, and a high-speed side drive gear 36 constituting a high-speed side engine gear train GHi is provided on a side opposite to the engine side (hereinafter referred to as a motor side). The first clutch CL1 is a hydraulic clutch capable of engaging and disengaging the input shaft 21 with and from the low-speed side drive gear 34, and is a so-called multi-plate friction clutch.

The generator shaft 23 is provided with a generator driven gear 40 that meshes with the generator drive gear 32. The generator drive gear 32 of the input shaft 21 and the generator driven gear 40 of the generator shaft 23 constitute the generator gear train Gg for transmitting rotation of the input shaft 21 to the generator shaft 23. On the motor side of the generator shaft 23, the generator GEN is disposed. The generator GEN is configured to include a rotor R that is fixed to the generator shaft 23, and a stator S that is fixed to the case 11 and disposed on an outer diameter side of the rotor R so as to face the rotor R.

When the rotation of the input shaft 21 is transmitted to the generator shaft 23 via the generator gear train Gg, the rotor R of the generator GEN is rotated by the rotation of the generator shaft 23. Thus, at the time of driving of the engine ENG, power of the engine ENG input from the input shaft 21 can be converted into electric power by the generator GEN.

The motor shaft 25 is provided with a motor drive gear 52 constituting a motor gear train Gm. On the motor shaft 25, the motor MOT is disposed on the motor side with respect to the motor drive gear 52. The motor MOT includes a rotor R that is fixed to the motor shaft 25, and a stator S that is fixed to the case 11 and disposed on an outer diameter side of the rotor R so as to face the rotor R.

The counter shaft 27 is provided with, in an order from the engine side, a low-speed side driven gear 60 that meshes with the low-speed side drive gear 34, an output gear 62 that meshes with a ring gear 70 of the differential mechanism D, a high-speed side driven gear 64 that meshes with the high-speed side drive gear 36 of the input shaft 21 via a second clutch CL2, and a motor driven gear 66 that meshes with the motor drive gear 52 of the motor shaft 25. The second clutch CL2 is a hydraulic clutch capable of engaging and disengaging the counter shaft 27 with and from the high-speed side driven gear 64, and is a so-called multi-plate friction clutch.

The low-speed side drive gear 34 of the input shaft 21 and the low-speed side driven gear 60 of the counter shaft 27 constitute the low-speed side engine gear train GLo for transmitting the rotation of the input shaft 21 to the counter shaft 27. The high-speed side drive gear 36 of the input shaft 21 and the high-speed side driven gear 64 of the counter shaft 27 constitute the high-speed side engine gear train GHi for transmitting the rotation of the input shaft 21 to the counter shaft 27. Here, the low-speed side engine gear train GLo including the low-speed side drive gear 34 and the low-speed side driven gear 60 has a larger reduction ratio than the high-speed side engine gear train GHi including the high-speed side drive gear 36 and the high-speed side driven gear 64.

Accordingly, when the first clutch CL1 is engaged and the second clutch CL2 is disengaged at the time of driving of the engine ENG, a driving force of the engine ENG is transmitted to the counter shaft 27 via the low-speed side engine gear train GLo at a large reduction ratio. On the other hand, when the first clutch CL1 is disengaged and the second clutch CL2 is engaged at the time of driving of the engine ENG, the driving force of the engine ENG is transmitted to the counter shaft 27 via the high-speed side engine gear train GHi at a small reduction ratio. Note that there is no occurrence that the first clutch CL1 and the second clutch CL2 are engaged at the same time.

The motor drive gear 52 of the motor shaft 25 and the motor driven gear 66 of the counter shaft 27 constitute the motor gear train Gm for transmitting rotation of the motor shaft 25 to the counter shaft 27. When the rotor R of the motor MOT is rotated, the rotation of the motor shaft 25 is transmitted to the counter shaft 27 via the motor gear train Gm. Accordingly, at the time of driving of the motor MOT, a driving force of the motor MOT is transmitted to the counter shaft 27 via the motor gear train Gm.

The output gear 62 of the counter shaft 27 and the ring gear 70 of the differential mechanism D constitute a final gear train Gf for transmitting rotation of the counter shaft 27 to the differential mechanism D. Accordingly, the driving force of the motor MOT input to the counter shaft 27 via the motor gear train Gm, the driving force of the engine ENG input to the counter shaft 27 via the low-speed side engine gear train GLo, and the driving force of the engine ENG input to the counter shaft 27 via the high-speed side engine gear train GHi are transmitted to the differential mechanism D via the final gear train Gf and transmitted from the differential mechanism D to an axle DS. As a result, a driving force for causing the vehicle 1 to travel is output via a pair of drive wheels DW provided at both ends of the axle DS.

The drive device 10 configured as described above has a power transmission path for transmitting the driving force of the motor MOT to the axle DS (that is, the drive wheels DW), a low-speed side power transmission path for transmitting the driving force of the engine ENG to the axle DS, and a high-speed side power transmission path for transmitting the driving force of the engine ENG to the axle DS. Thus, as will be described later, the vehicle 1 equipped with the drive device 10 can take a plurality of traveling modes such as an EV traveling mode or a hybrid traveling mode in which the vehicle travels by power output from the motor MOT, and a low-speed side engine traveling mode or a high-speed side engine traveling mode in which the vehicle travels by power output from the engine ENG.

The control device 100 acquires vehicle information related to the vehicle 1 based on detection signals received from various sensors provided in the vehicle 1, and controls the drive device 10 based on the acquired vehicle information. Examples of the sensors provided in the vehicle 1 include a vehicle speed sensor that detects a rotation speed of the axle DS, an accelerator position sensor (hereinafter, also referred to as an AP sensor) that detects an operation amount with respect to an accelerator pedal of the vehicle 1, a brake sensor that detects an operation amount with respect to a brake pedal of the vehicle 1, an engine rotation speed sensor that detects a rotation speed of the engine ENG (hereinafter, also referred to as an engine rotation speed), and a battery sensor that detects a state of the battery BAT (for example, a voltage between terminals, a charging/discharging current, and a temperature of the battery BAT).

The vehicle information includes information indicating a traveling state of the vehicle 1. Examples of the traveling state of the vehicle 1 include a speed of the vehicle 1 (hereinafter, also referred to as a vehicle speed), an AP opening degree indicating an operation amount with respect to the accelerator pedal provided in the vehicle 1 (that is, an accelerator position), a driving force required for traveling of the vehicle 1 (hereinafter, also referred to as a required driving force), and an engine rotation speed.

The vehicle speed can be acquired based on a detection signal from the vehicle speed sensor. The AP opening degree can be acquired based on a detection signal from the AP sensor. The engine rotation speed can be acquired based on a detection signal from the engine rotation speed sensor. The required driving force can be derived based on the vehicle speed, the AP opening degree, or the like.

The vehicle information further includes battery information related to the battery BAT provided in the vehicle 1. The battery information includes information indicating a state of charge (SOC) that is a remaining capacity of the battery BAT. The SOC of the battery BAT is hereinafter also referred to as a battery SOC. The battery SOC can be derived based on a detection signal (for example, a voltage between terminals or a charging/discharging current of the battery BAT) from the battery sensor. In addition, the battery information may include information such as a voltage between terminals, a charging/discharging current, and a temperature of the battery BAT detected by the battery sensor.

The control device 100 controls the drive device 10 based on the vehicle information (that is, the traveling state of the vehicle 1 and the battery information) to cause the vehicle 1 to travel in any one of the plurality of traveling modes (to be described later) that the vehicle 1 can take. In controlling the drive device 10, for example, the control device 100 controls the driving of the engine ENG by controlling supply of fuel to the engine ENG, controls the driving of the motor MOT by controlling supply of electric power from the generator GEN or the battery BAT to the motor MOT, and controls power generation of the generator GEN by controlling a field current or the like flowing through coils of the generator GEN.

Further, in controlling the drive device 10, the control device 100 controls an actuator (not shown), which operates the first clutch CL1, to engage or disengage the first clutch CL1. Similarly, the control device 100 controls an actuator (not shown), which operates the second clutch CL2, to engage or disengage the second clutch CL2.

In this way, the control device 100 controls the engine ENG, the generator GEN, the motor MOT, the first clutch CL1, and the second clutch CL2, thereby enabling the vehicle 1 to travel in any one of the plurality of traveling modes to be described later.

In addition, the control device 100 is configured to be capable of executing fuel cut control for stopping fuel supply to the engine ENG. The control device 100 executes the fuel cut control when an execution condition set in advance by a manufacturer or the like of the vehicle 1 is satisfied. In addition, for example, the control device 100 is capable of setting a fuel cut control prohibition flag, which will be described later, to ON so that the fuel cut control is not executed temporarily. An example of a case where the fuel cut control is executed by the control device 100 and a case where the fuel cut control is not executed by the control device 100 will be described later.

Note that the control device 100 is implemented with, for example, an electronic control unit (ECU) that includes a processor, a memory, an interface, and the like.

[Traveling Modes that Vehicle can Take]

Figure 2:
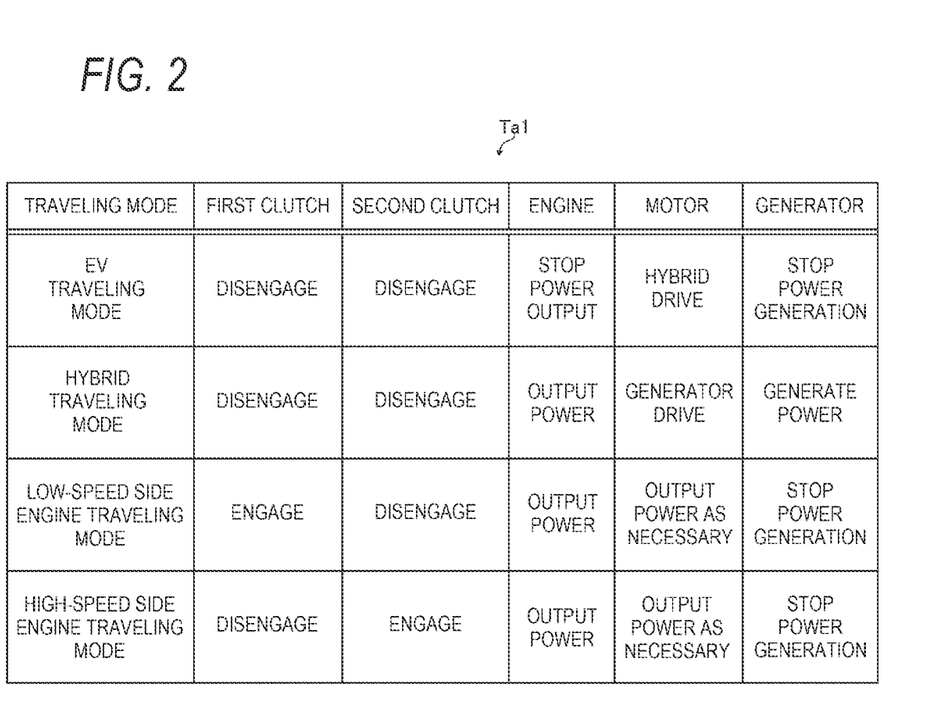
FIG. 2 is a table illustrating contents of traveling modes.

Next, traveling modes that can be taken by the vehicle 1 will be described with reference to a traveling mode table Ta1 illustrated in FIG. 2. As illustrated in FIG. 2, the vehicle 1 can take an EV traveling mode, a hybrid traveling mode, a low-speed side engine traveling mode, and a high-speed side engine traveling mode.

[EV Traveling Mode]

The EV traveling mode is a traveling mode in which electric power is supplied from the battery BAT to the motor MOT and the vehicle 1 is caused to travel by power output from the motor MOT based on the electric power.

Specifically, in the case of the EV traveling mode, the control device 100 disengages both the first clutch CL1 and the second clutch CL2. In addition, in the case of the EV traveling mode, the control device 100 stops fuel injection to the engine ENG to stop output of power from the engine ENG. Further, in the case of the EV traveling mode, the control device 100 supplies electric power from the battery BAT to the motor MOT, and causes the motor MOT to output power corresponding to the electric power (illustrated as "battery drive" of motor). Thus, in the EV traveling mode, the vehicle 1 travels by the power output from the motor MOT based on the electric power supplied from the battery BAT.

In the EV traveling mode, as described above, the output of the power from the engine ENG is stopped, and both the first clutch CL1 and the second clutch CL2 are disengaged. Accordingly, in the EV traveling mode, power is not input to the generator GEN, and power generation by the generator GEN is not performed (illustrated as "stop power generation" of generator).

[Hybrid Traveling Mode]

The hybrid traveling mode is a traveling mode in which electric power is supplied from at least the generator GEN to the motor MOT, and the vehicle 1 is caused to travel by power output from the motor MOT based on the electric power. The hybrid traveling mode is an example of series traveling in which the electric power generated by the generator GEN is supplied to the motor MOT, and the motor MOT drives the drive wheels DW to cause the vehicle 1 to travel.

Specifically, in the case of the hybrid traveling mode, the control device 100 disengages both the first clutch CL1 and the second clutch CL2. In addition, in the case of the hybrid traveling mode, the control device 100 performs fuel injection to the engine ENG to output power from the engine ENG. The power output from the engine ENG is input to the generator GEN via the generator gear train Gg. Accordingly, power generation by the generator GEN is performed.

Further, in the case of the hybrid traveling mode, the control device 100 supplies electric power generated by the generator GEN to the motor MOT, and causes the motor MOT to output power corresponding to the electric power (illustrated as "generator drive" of motor). The electric power supplied from the generator GEN to the motor MOT is larger than the electric power supplied from the battery BAT to the motor MOT. Accordingly, in the hybrid traveling mode, the power output from the motor MOT (the driving force of the motor MOT) can be increased as compared with that in the EV traveling mode, and a large driving force can be obtained as the driving force of the vehicle 1.

In the case of the hybrid traveling mode, the control device 100 can also supply the electric power from the battery BAT to the motor MOT as necessary. That is, the control device 100 can supply electric power to the motor MOT from both the generator GEN and the battery BAT in the hybrid traveling mode. Accordingly, since the electric power supplied to the motor MOT can be increased as compared with that in the case where the electric power is supplied to the motor MOT only by the generator GEN, the power output from the motor MOT can be further increased, and a larger driving force can be obtained as the driving force of the vehicle 1.

For example, in a speed range from 0 (zero) to a predetermined speed of the vehicle, the hybrid traveling mode is a traveling mode in which the largest driving force can be obtained as the driving force of the vehicle 1 among the traveling modes that the vehicle 1 can take. Accordingly, for example, in a situation where the stopped vehicle 1 is started and quickly accelerated, the control device 100 causes the vehicle 1 to travel in the hybrid traveling mode from the viewpoint of securing the acceleration performance of the vehicle 1.

[Low-Speed Side Engine Traveling Mode]

The low-speed side engine traveling mode is a traveling mode in which the vehicle 1 is caused to travel by transmitting power output from the engine ENG to the drive wheels DW through the low-speed side power transmission path.

Specifically, in the case of the low-speed side engine traveling mode, the control device 100 performs fuel injection to the engine ENG to output power from the engine ENG. In addition, in the case of the low-speed side engine traveling mode, the control device 100 engages the first clutch CL1 and disengages the second clutch CL2. Accordingly, in the low-speed side engine traveling mode, the power output from the engine ENG is transmitted to the drive wheels DW via the low-speed side engine gear train GLo, the final gear train Gf, and the differential mechanism D to cause the vehicle 1 to travel.

In addition, in the case of the low-speed side engine traveling mode, the power output from the engine ENG is also input to the generator GEN via the generator gear train Gg, but power generation by the generator GEN is controlled so as not to be performed. For example, in the low-speed side engine traveling mode, a switching element provided in an electric-power transmission path between the generator GEN and the battery BAT (for example, a switching element of an inverter device provided between the generator GEN and the battery BAT) is turned off, so that the power generation by the generator GEN is controlled so as not to be performed. Accordingly, in the low-speed side engine traveling mode, it is possible to reduce a loss caused by the generator GEN performing power generation, and to reduce an amount of heat generated by the generator GEN and the like. In addition, in the low-speed side engine traveling mode, when the vehicle 1 is braked, regenerative power generation may be performed by the motor MOT, and the battery BAT may be charged with the generated electric power.

In addition, in the case of the low-speed side engine traveling mode, the control device 100 can supply electric power from the battery BAT to the motor MOT as necessary. Accordingly, in the low-speed side engine traveling mode, the vehicle 1 can be caused to travel also using the power output from the motor MOT based on the electric power supplied from the battery BAT, and a larger driving force can be obtained as the driving force of the vehicle 1 as compared with that in a case where the vehicle 1 is caused to travel only by the power of the engine ENG.

[High-Speed Side Engine Traveling Mode]

The high-speed side engine traveling mode is a traveling mode in which the vehicle 1 is caused to travel by transmitting power output from the engine ENG to the drive wheels DW through the high-speed side power transmission path.

Specifically, in the case of the high-speed side engine traveling mode, the control device 100 performs fuel injection to the engine ENG to output power from the engine ENG. In addition, in the case of the high-speed side engine traveling mode, the control device 100 engages the second clutch CL2 and disengages the first clutch CL1. Accordingly, in the high-speed side engine traveling mode, the power output from the engine ENG is transmitted to the drive wheels DW via the high-speed side engine gear train GHi, the final gear train Gf, and the differential mechanism D to cause the vehicle 1 to travel.

In addition, in the case of the high-speed side engine traveling mode, the power output from the engine ENG is also input to the generator GEN via the generator gear train Gg, but power generation by the generator GEN is controlled so as not to be performed. Accordingly, in the high-speed side engine traveling mode, it is possible to reduce a loss caused by the generator GEN performing power generation, and to reduce an amount of heat generated by the generator GEN and the like. In addition, in the high-speed side engine traveling mode, when the vehicle 1 is braked, regenerative power generation may be performed by the motor MOT, and the battery BAT may be charged with the generated electric power.

In addition, in the high-speed side engine traveling mode, the control device 100 can supply electric power from the battery BAT to the motor MOT as necessary. Accordingly, in the high-speed side engine traveling mode, the vehicle 1 can be caused to travel also using the power output from the motor MOT based on the electric power supplied from the battery BAT, and a larger driving force can be obtained as the driving force of the vehicle 1 as compared with that in the case where the vehicle 1 is caused to travel only by the power of the engine ENG.

[Engine Rotation Speed at the Time of Acceleration in Hybrid Traveling Mode]

Figure 3:
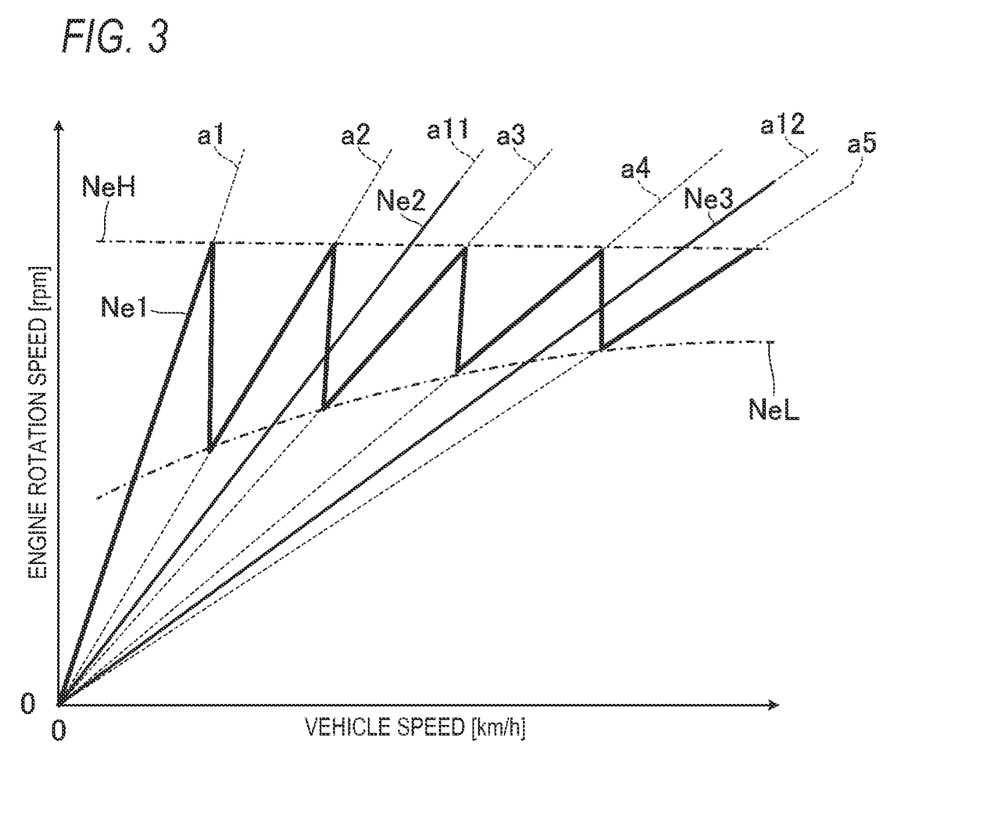
FIG. 3 is a graph illustrating a control example of an engine rotation speed at the time of acceleration in a hybrid traveling mode.

Next, an engine rotation speed at the time of acceleration in the hybrid traveling mode will be described with reference to FIG. 3. In FIG. 3, a vertical axis indicates an engine rotation speed [rpm], and a horizontal axis indicates a vehicle speed [km/h].

An engine rotation speed Ne1 illustrated in FIG. 3 is an engine rotation speed at the time of acceleration in the hybrid traveling mode. As indicated by the engine rotation speed Ne1, at the time of acceleration in the hybrid traveling mode, the control device 100 controls the engine rotation speed so as to vary between a predetermined upper-limit rotation speed NeH and a predetermined lower-limit rotation speed NeL. The upper-limit rotation speed NeH is a target rotation speed at the time of increasing the engine rotation speed, and is an example of a first target rotation speed in the present disclosure. The lower-limit rotation speed NeL is a target rotation speed at the time of reducing the engine rotation speed, and is an example of a second target rotation speed in the present disclosure. As illustrated in FIG. 3, the lower-limit rotation speed NeL is smaller than the upper-limit rotation speed NeH.

Specifically, in the case of the hybrid traveling mode, the control device 100 first increases the engine rotation speed at a predetermined increase rate a1 accompanying an increase in the vehicle speed from a state where both the vehicle speed and the engine rotation speed are 0 (zero). When the engine rotation speed reaches the upper-limit rotation speed NeH corresponding to the vehicle speed at that time, the engine rotation speed is reduced to a lower-limit rotation speed NeL corresponding to the vehicle speed at that time. Thereafter, the control device 100 increases the engine rotation speed again from the lower-limit rotation speed NeL as the vehicle speed increases. However, at this time, the engine rotation speed is increased at an increase rate a2 smaller than the increase rate a1.

Thereafter, in the same manner, the control device 100 reduces the engine rotation speed to a corresponding lower-limit rotation speed NeL when the rotation speed reaches the upper-limit rotation speed NeH, and then increases the engine rotation speed at different increase rates of an increase rate a3, an increase rate a4, and an increase rate a5 separately as the vehicle speed increases. Here, the increase rate a2>the increase rate a3>the increase rate a4>the increase rate a5.

In the hybrid traveling mode, since both the first clutch CL1 and the second clutch CL2 are disengaged as described above, the engine rotation speed can be set arbitrarily regardless of the vehicle speed. By controlling the engine rotation speed so as to vary between the upper-limit rotation speed NeH and the lower-limit rotation speed NeL accompanying an increase in the vehicle speed in this way, it is possible to allow the driver to feel a natural change in the operation sound of the engine ENG that is linked with the vehicle speed as if a transmission shift is being performed by a stepped transmission. The control for varying the engine rotation speed between the upper-limit rotation speed NeH and the lower-limit rotation speed NeL accompanying an increase in the vehicle speed is hereinafter also referred to as pseudo-shift rotation speed control.

As a method of reducing the engine rotation speed when the vehicle 1 is traveling in the hybrid traveling mode, there are a method of increasing a load of the engine ENG by increasing a driving force (hereinafter, also referred to as a power generation torque) required to drive the generator GEN and a method of stopping the fuel supply to the engine ENG by executing the above-described fuel cut control.

When reducing the engine rotation speed by the pseudo-shift rotation speed control, that is, when reducing the engine rotation speed at the time of acceleration in the hybrid traveling mode, the control device 100 reduces the engine rotation speed by increasing the power generation torque. In other words, the control device 100 does not execute the fuel cut control when reducing the engine rotation speed at the time of acceleration in the hybrid traveling mode.

When the engine rotation speed is reduced by increasing the power generation torque, the engine rotation speed can be increased more quickly as necessary immediately after the engine rotation speed is reduced than when the engine rotation speed is reduced by the fuel cut control. In other words, when the engine rotation speed is reduced by the fuel cut control, if the engine rotation speed needs to be increased immediately after the engine rotation speed is reduced, a delay may occur in the increase.

Therefore, when reducing the engine rotation speed by the pseudo-shift rotation speed control, that is, when reducing the engine rotation speed at the time of acceleration in the hybrid traveling mode, the control device 100 reduces the engine rotation speed by increasing the power generation torque. Accordingly, the control device 100 can reduce the engine rotation speed while suppressing a delay in increasing the engine rotation speed immediately after the reduction of the engine rotation speed. That is, since the control device 100 can quickly increase the engine rotation speed immediately after the engine rotation speed is reduced, it is possible to implement the above-described pseudo-shift rotation speed control while securing the responsiveness of the vehicle 1, and it is possible to allow the driver to feel a natural change in the operation sound of the engine ENG that is linked with the vehicle speed as if a transmission shift is performed by a stepped transmission.

An engine rotation speed Ne2 illustrated in FIG. 3 is an example of an engine rotation speed in the low-speed side engine traveling mode. As described above, in the low-speed side engine traveling mode, the engine ENG and the axle DS (that is, the drive wheels DW) are mechanically connected to each other. Therefore, as indicated by the engine rotation speed Ne2, the engine rotation speed and the vehicle speed linearly correspond to each other. Specifically, in the present embodiment, in the case of the low-speed side engine traveling mode, the engine rotation speed increases at an increase rate a11 as the vehicle speed increases. For example, here, the increase rate a2>the increase rate a11>the increase rate a3.

An engine rotation speed Ne3 illustrated in FIG. 3 is an example of an engine rotation speed in the high-speed side engine traveling mode. As described above, in the high-speed side engine traveling mode, the engine ENG and the axle DS are mechanically connected to each other as in the low-speed side engine traveling mode. Therefore, as indicated by the engine rotation speed Ne3, the engine rotation speed and the vehicle speed linearly correspond to each other. Specifically, in the present embodiment, in the high-speed side engine traveling mode, the engine rotation speed increases at an increase rate a12 as the vehicle speed increases. For example, here, the increase rate a4>the increase rate a12>the increase rate a5.

In FIG. 3, for the sake of convenience, the engine rotation speed Ne2 and the engine rotation speed Ne3 in a state where the vehicle speed is 0 (zero) are also illustrated, but the low-speed side engine traveling mode and the high-speed side engine traveling mode may not be established at the time when the vehicle speed is 0 (zero).

[Engine Rotation Speed at Time of Deceleration in Hybrid Traveling Mode]

From the viewpoint of allowing the driver to feel a natural change in the operation sound of the engine ENG that is linked with the vehicle speed, it is preferable that the engine rotation speed is also reduced at the time of deceleration in the hybrid traveling mode.

As described above, it is possible to reduce the engine rotation speed while suppressing a delay in increasing the engine rotation speed immediately after the reduction of the engine rotation speed, by increasing the power generation torque. However, at the time of deceleration in the hybrid traveling mode, unlike at the time of acceleration, regenerative power generation by the motor MOT is performed, and thus the power generation torque may not be able to be increased.

Specifically, when regenerative power generation by the motor MOT is performed, electric power generated by the regenerative power generation needs to be processed using some method such as supplying the electric power to the battery BAT. However, there is an upper limit to the electric power that the vehicle 1 can process per unit time (hereinafter, also referred to as processable electric power, and being, for example, acceptable electric power per unit time for the battery BAT). Therefore, when the upper limit of the processable electric power is reached due to the electric power generated by the regenerative power generation of the motor MOT, the electric power generated by the generator GEN cannot be processed.

Therefore, when the upper limit of the processable electric power is reached due to the electric power generated by the regenerative power generation of the motor MOT, it is not possible to reduce the engine rotation speed by increasing the power generation torque. On the other hand, since it is not possible to reduce the engine rotation speed by increasing the power generation torque, the engine rotation speed is not reduced even though the vehicle 1 is decelerating. As a result, if the engine rotation speed is kept high, the driver may have a feeling of strangeness, leading to a decrease in the marketability of the vehicle 1.

Therefore, when the vehicle 1 is traveling in the hybrid traveling mode and there is a deceleration request, the control device 100 executes the fuel cut control according to a rotation speed difference between the engine rotation speed and the target rotation speed. Here, "when there is a deceleration request" is, for example, when the required driving force derived based on an AP opening degree or the like is negative (−: minus). When the control device 100 controls the drive device 10 (for example, the engine ENG or the motor MOT) using the negative required driving force as a target value, an actual driving force of the vehicle 1 also becomes negative, and the vehicle 1 decelerates. In this way, the control device 100 executes the fuel cut control in accordance with the rotation speed difference between the engine rotation speed and the target rotation speed when the vehicle 1 is traveling in the hybrid traveling mode and there is a deceleration request, so that the engine rotation speed can be appropriately suppressed from being kept high when the vehicle 1 is traveling in the hybrid traveling mode and is decelerating.

[Case where Fuel Cut Control is Executed and Case where Fuel Cut Control is not Executed]

Figure 4:
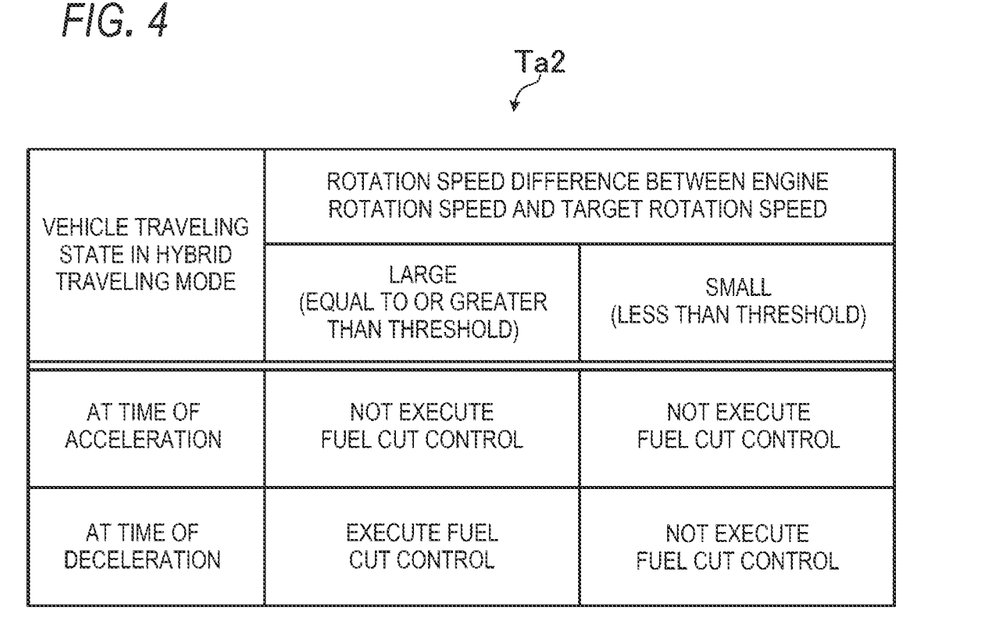
FIG. 4 is a table illustrating an example of a case where the control device of the present embodiment executes fuel cut control and a case where the control device of the present embodiment does not execute the fuel cut control.

Here, a case where the control device 100 executes the fuel cut control and a case where the control device 100 does not execute the fuel cut control will be described in detail with reference to a fuel cut control execution/non-execution table Ta2 illustrated in FIG. 4.

As a premise, when the vehicle 1 is traveling in the hybrid traveling mode, the control device 100 performs control based on a traveling state of the vehicle 1 such that the engine rotation speed becomes a predetermined target rotation speed. At this time, if the engine rotation speed is lower than the target rotation speed, the control device 100 increases the engine rotation speed so as to achieve the target rotation speed, and if the engine rotation speed is higher than the target rotation speed, the control device 100 decreases the engine rotation speed so as to achieve the target rotation speed.

When the vehicle 1 is traveling in the hybrid traveling mode and the vehicle 1 is accelerating, the control device 100 performs control such that the engine rotation speed becomes the upper-limit rotation speed NeH or the lower-limit rotation speed NeL corresponding to a vehicle speed at that time, as described above. On the other hand, when the vehicle 1 is traveling in the hybrid traveling mode and the vehicle 1 is decelerating, the control device 100 determines a target rotation speed based on, for example, a deceleration request from the driver (for example, an AP opening degree or an operation amount with respect to the brake pedal), and performs control such that the engine rotation speed becomes the target rotation speed.

Then, when the vehicle 1 is traveling in the hybrid traveling mode and there is a deceleration request (that is, the vehicle 1 is decelerating), the control device 100 executes the fuel cut control if the rotation speed difference between the engine rotation speed and the target rotation speed (where the target rotation speed<the engine rotation speed) is equal to or greater than a predetermined threshold. That is, when the rotation speed difference between the engine rotation speed and the target rotation speed is relatively large, the control device 100 can reduce the engine rotation speed by executing the fuel cut control.

When the vehicle 1 is traveling in the hybrid traveling mode and the vehicle 1 is decelerating, if the rotation speed difference between the engine rotation speed and the target rotation speed is large, it is assumed that electric power generated by the motor MOT through regenerative power generation is also large. Therefore, in such a case, by executing the fuel cut control, the control device 100 can reduce the engine rotation speed even when the electric power generated by the motor MOT through regenerative power generation is large. Accordingly, the control device 100 can suppress the engine rotation speed from being kept high at the time of deceleration of the vehicle 1. The threshold described above is, for example, set in advance in the control device 100 by a manufacturer or the like of the vehicle 1.

On the other hand, when the vehicle 1 is traveling in the hybrid traveling mode and there is a deceleration request (that is, the vehicle 1 is decelerating), if the rotation speed difference between the engine rotation speed and the target rotation speed (where the target rotation speed<the engine rotation speed) is less than the threshold (that is, if the rotation speed difference is relatively small), the control device 100 does not execute the fuel cut control. At this time, the control device 100 reduces the engine rotation speed by increasing the power generation torque.

When the vehicle 1 is traveling in the hybrid traveling mode and the vehicle 1 is decelerating, if the rotation speed difference between the engine rotation speed and the target rotation speed is small, a situation where the engine rotation speed is increased immediately after the engine rotation speed is reduced (for example, the vehicle 1 is accelerated again) is likely to occur. Therefore, in such a case, the control device 100 reduces the engine rotation speed by increasing the power generation torque instead of executing the fuel cut control, so that it is possible to reduce the engine rotation speed while suppressing a delay in increasing the engine rotation speed immediately after the reduction of the engine rotation speed. Accordingly, even when the engine rotation speed is to be increased immediately after being reduced, the control device 100 can quickly increase the engine rotation speed. The responsiveness of the vehicle 1 can be secured and the engine rotation speed can be suppressed from being kept high at the time of deceleration of the vehicle 1.

The control device 100 does not execute the fuel cut control when the vehicle 1 is traveling in the hybrid traveling mode and the vehicle 1 is accelerating. At this time, if the engine rotation speed is higher than the target rotation speed, the control device 100 reduces the engine rotation speed by increasing the power generation torque. Accordingly, since the control device 100 can quickly increase the engine rotation speed immediately after the engine rotation speed is reduced, it is possible to implement the above-described pseudo-shift rotation speed control while securing the responsiveness of the vehicle 1, and it is possible to allow the driver to feel a natural change in the operation sound of the engine ENG that is linked with the vehicle speed as if a transmission shift is performed by a stepped transmission.

[Specific Control Example of Engine Rotation Speed Performed by Control Device in Hybrid Traveling Mode]

Figure 5:
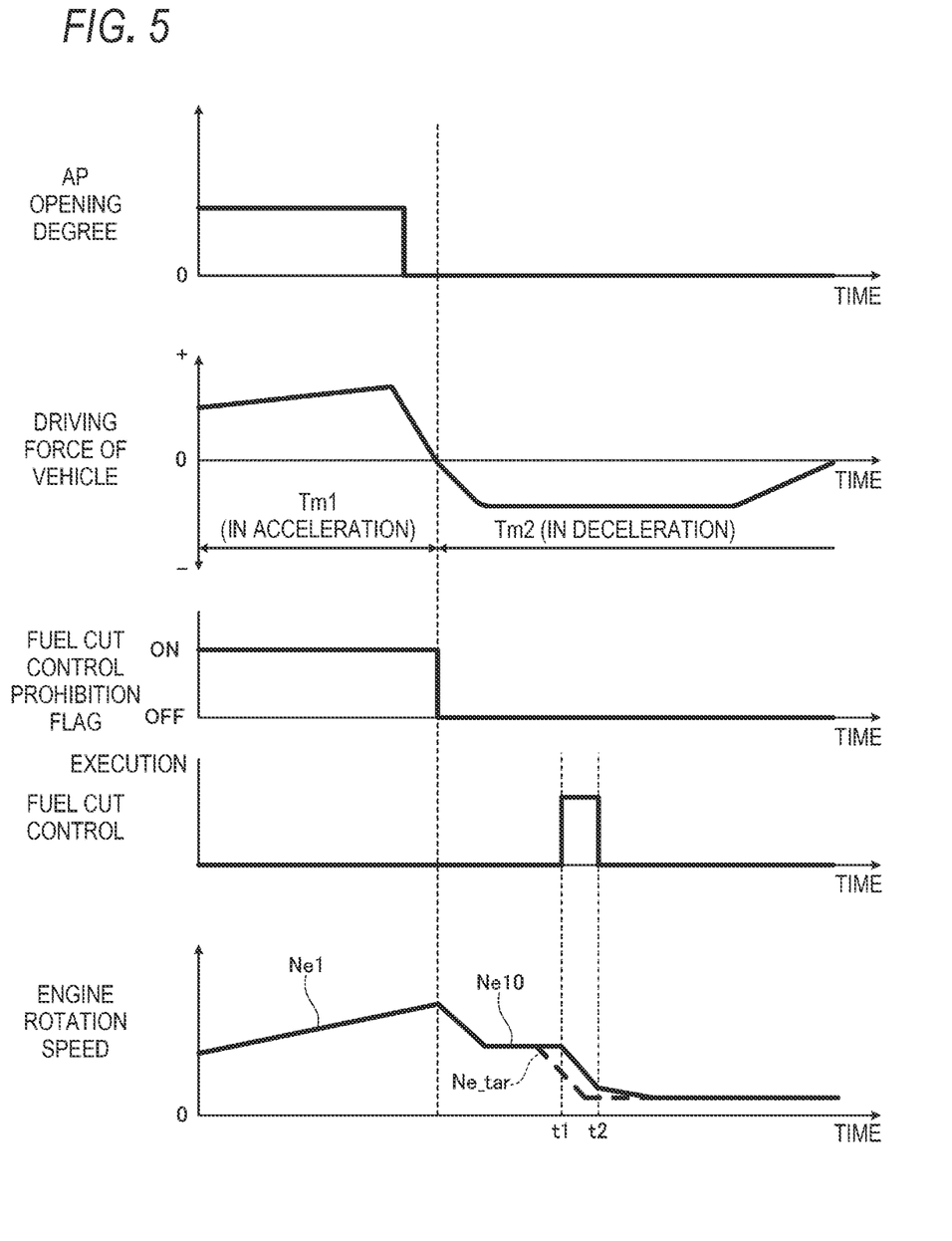
FIG. 5 is a timing chart illustrating a control example of an engine rotation speed in a hybrid traveling mode.

Next, with reference to FIG. 5, a specific control example of the engine rotation speed performed by the control device 100 in the hybrid traveling mode will be described. FIG. 5 illustrates a timing relationship between the AP opening degree, the driving force of the vehicle 1, the fuel cut control prohibition flag, the fuel cut control, and the engine rotation speed.

In FIG. 5, a period Tm1 in which the driving force of the vehicle 1 is positive (+: plus) is a period in which the vehicle 1 is accelerating in the hybrid traveling mode, and is a period in which driving of the generator GEN by the engine ENG (that is, power generation by the generator GEN) is necessary. In the period Tm1, the engine rotation speed is controlled as, for example, the engine rotation speed Ne1 shown in FIG. 3.

In addition, in FIG. 5, a period Tm2 in which the driving force of the vehicle 1 is negative (−: minus) is a period in which the vehicle 1 is decelerating in the hybrid traveling mode, and is a period in which driving of the generator GEN by the engine ENG (that is, power generation by the generator GEN) is not necessary. Note that an engine rotation speed Ne10 shown in FIG. 5 indicates the engine rotation speed in the period Tm2.

When the vehicle 1 is accelerating in the hybrid traveling mode, the control device 100 sets the fuel cut control prohibition flag to ON. Accordingly, when the vehicle 1 is accelerating in the hybrid traveling mode, the control device 100 can avoid executing the fuel cut control.

On the other hand, when the acceleration of the vehicle 1 ends in the hybrid traveling mode, the control device 100 sets the fuel cut control prohibition flag to OFF. Accordingly, when the vehicle 1 is not accelerating in the hybrid traveling mode, the control device 100 can execute the fuel cut control as necessary.

When the vehicle 1 is not accelerating in the hybrid traveling mode, the control device 100 executes the fuel cut control if the rotation speed difference between the engine rotation speed Ne10 and a target rotation speed Ne_tar is equal to or greater than the threshold. In the example illustrated in FIG. 5, since the rotation speed difference between the engine rotation speed Ne10 and the target rotation speed Ne_tar is equal to or greater than the threshold in a period from a time-point t1 to a time-point t2, the control device 100 executes the fuel cut control in the period from the time-point t1 to the time-point t2.

As described above, according to the control device 100 of the present embodiment, it is possible to appropriately suppress the engine rotation speed from being kept high at the time of deceleration during traveling in the hybrid traveling mode.

The present disclosure is not limited to the embodiment described above, and modifications, improvements, or the like can be made as appropriate.

For example, in the above-described embodiment, the traveling modes (the low-speed side engine traveling mode and the high-speed side engine traveling mode) in which the power of the engine ENG is transmitted to the drive wheels DW to cause the vehicle 1 to travel are provided, but the vehicle 1 may not take these traveling modes. In addition, only one of the low-speed side engine traveling mode and the high-speed side engine traveling mode may be provided as the traveling mode in which the power of the engine ENG is transmitted to the drive wheels DW to cause the vehicle 1 to travel.

In the present specification, at least the following matters are described. Although corresponding components and the like in the above-described embodiment are shown in parentheses, the present disclosure is not limited thereto.

(1) A vehicle control device (control device 100) that controls a vehicle (vehicle 1), the vehicle including an internal combustion engine (engine ENG), a generator (generator GEN) driven by the internal combustion engine, and an electric motor (motor MOT) coupled to a drive wheel (drive wheels DW) and capable of driving the drive wheel by being supplied with electric power from the generator, and the vehicle being capable of series traveling in which electric power generated by the generator is supplied to the electric motor and the electric motor drives the drive wheel to cause the vehicle to travel, in which the vehicle control device is configured to:
execute fuel cut control for stopping fuel supply to the internal combustion engine;
when the vehicle is in series traveling, perform control based on a traveling state of the vehicle such that a rotation speed of the internal combustion engine is a predetermined target rotation speed; and
when the vehicle is in series traveling and there is a deceleration request, execute the fuel cut control in accordance with a rotation speed difference between the rotation speed of the internal combustion engine and the target rotation speed.

According to (1), when the vehicle is in series traveling and there is a deceleration request, the fuel cut control is executed in accordance with the rotation speed difference between the rotation speed of the internal combustion engine and the target rotation speed, and thus it is possible to appropriately suppress the rotation speed of the internal combustion engine from being kept high at the time of deceleration in the series traveling.

(2) The vehicle control device according to (1),
in which when the vehicle is in series traveling and there is a deceleration request, the fuel cut control is executed in a case where the rotation speed difference is equal to or greater than a threshold, and the fuel cut control is not executed in a case where the rotation speed difference is less than the threshold.

According to (2), when the vehicle is in series traveling and there is a deceleration request, the fuel cut control is executed in a case where the rotation speed difference between the rotation speed of the internal combustion engine and the target rotation speed is equal to or greater than the threshold, and the fuel cut control is not executed in a case where the rotation speed difference is less than the threshold. Thus, it is possible to suppress the rotation speed of the internal combustion engine from being kept high at the time of deceleration during series traveling.

(3) The vehicle control device according to (1) or (2),
in which when the vehicle is in series traveling and is accelerating, the fuel cut control is not executed.

According to (3), when the vehicle is in series traveling and is accelerating, the fuel cut control is not executed, and thus it is possible to secure the responsiveness of the vehicle in a case where the rotation speed of the internal combustion engine needs to be increased after being reduced.

(4) The vehicle control device according to any one of (1) to (3),
- in which when the vehicle is in series traveling and is accelerating, the rotation speed of the internal combustion engine is increased to a first target rotation speed (upper-limit rotation speed NeH), and in a case where the first target rotation speed is reached, the rotation speed of the internal combustion engine is reduced to a second target rotation speed (lower-limit rotation speed NeL) lower than the first target rotation speed.

According to (4), it is possible to allow a driver to feel a natural change in an operation sound of the internal combustion engine that is linked with a speed of the vehicle.

The invention claimed is:

1. A vehicle control device that controls a vehicle, the vehicle comprising an internal combustion engine, a generator driven by the internal combustion engine, and an electric motor coupled to a drive wheel and capable of driving the drive wheel by being supplied with electric power from the generator, and the vehicle being capable of series traveling in which electric power generated by the generator is supplied to the electric motor and the electric motor drives the drive wheel to cause the vehicle to travel, wherein the vehicle control device is configured to:
- execute fuel cut control for stopping fuel supply to the internal combustion engine;
- when the vehicle is in the series traveling, perform control based on a traveling state of the vehicle such that a rotation speed of the internal combustion engine is a predetermined target rotation speed;
- when the vehicle is in the series traveling and is accelerating, perform pseudo-shift control in which the rotation speed of the internal combustion engine is increased to a first target rotation speed, and in a case where the first target rotation speed is reached, the rotation speed of the internal combustion engine is reduced to a second target rotation speed lower than the first target rotation speed; and
- when the vehicle is in the series traveling and there is a deceleration request during the pseudo-shift control, execute the fuel cut control in accordance with a rotation speed difference between the rotation speed of the internal combustion engine and the target rotation speed.

* * * * *